United States Patent [19]

Wald

[11] 4,121,000

[45] Oct. 17, 1978

[54] COATING COMPOSITION COMPRISING A POLYSILOXANE RESIN-FORMING PRECONDENSATE, A FLUOROCARBON POLYMER, AN EPOXY RESIN, A SILICONE FLUID, AND AN INORGANIC HARDENING AGENT

[75] Inventor: David K. Wald, Cherry Hill, N.J.

[73] Assignee: E. I. Du Pont de Nemours and Company, Wilmington, Del.

[21] Appl. No.: 871,698

[22] Filed: Jan. 23, 1978

Related U.S. Application Data

[63] Continuation-in-part of Ser. No. 664,233, Mar. 5, 1976.

[30] Foreign Application Priority Data

Mar. 2, 1977 [CA] Canada .................................. 272978

[51] Int. Cl.$^2$ ............................................. C08L 83/12
[52] U.S. Cl. ............................... 428/35; 260/29.1 SB; 260/33.2 EP; 260/33.4 EP
[58] Field of Search ................. 260/29.1 SB, 33.2 EP, 260/33.2 SB, 33.4 EP, 33.4 F, 33.4 SB, 375 B; 428/35; 99/339

[56] References Cited

U.S. PATENT DOCUMENTS

| | | | |
|---|---|---|---|
| 2,672,104 | 3/1954 | Clark | 107/54 |
| 3,154,597 | 10/1964 | Mc Horten | 260/824 |
| 3,170,962 | 2/1965 | Tyler | 260/824 |
| 3,308,080 | 3/1967 | Kaenni | 428/35 |
| 3,449,290 | 6/1969 | Foster | 260/37 |
| 3,801,522 | 4/1974 | Vasta | 260/332 SB |
| 3,801,522 | 4/1974 | Nosta | 260/29.1 R |
| 3,925,276 | 12/1975 | Merrill | 260/332 SB |
| 3,926,885 | 12/1975 | Keil | 260/29.1 SB |
| 4,066,817 | 1/1978 | De Rossi | 260/37 SB |

*Primary Examiner*—Joseph L. Schofer
*Assistant Examiner*—Peter F. Kulkosky

[57] ABSTRACT

A coating composition comprising
 (a) a binder containing a polysiloxane resin-forming precondensate and an epoxy resin,
 (b) a dimethylpolysiloxane fluid,
 (c) a fluorocarbon polymer,
 (d) an inorganic hardening agent, and
 (e) an inert liquid carrier.

The composition forms finishes that have thermal stability, release properties, high gloss, hardness, abrasion resistance, and excellent adhesion to unprimed, untreated metal substrates.

12 Claims, No Drawings

COATING COMPOSITION COMPRISING A POLYSILOXANE RESIN-FORMING PRECONDENSATE, A FLUOROCARBON POLYMER, AN EPOXY RESIN, A SILICONE FLUID, AND AN INORGANIC HARDENING AGENT

CROSS-REFERENCE TO RELATED APPLICATION

This application is a continuation-in-part of copending application Ser. No. 664,233, filed Mar. 5, 1976, and assigned to the assignee of the present application.

BACKGROUND OF THE INVENTION (1) Field of the Invention

This invention is directed to a coating composition that is useful as a finish for cooking vessels because of its thermal stability, release properties, gloss, hardness, abrasion resistance, and adhesion to untreated, unprimed metal substrates.

(2) Prior Art

Cookware and bakeware items have been coated with fluorocarbon polymers such as polytetrafluoroethylene and copolymers thereof. Finishes of fluorocarbons have excellent thermal stability and good release properties and have been widely used and well accepted.

However, a primer is generally required for these coatings, along with special treatment of the metal substrate, to obtain excellent adhesion of the coating. Moreover, the few coating compositions which do not require a primer or substrate treatment are only available in dark colors.

Therefore, it would be desirable to have a coating composition that could be applied to an unprimed untreated substrate and which could provide a light colored finish upon baking.

The coating composition of this invention meets the above desires while forming a finish that has release properties, thermal stability, high gloss, good hardness, and abrasion resistance, and is an ideal coating composition for cooking vessels, particularly bakeware, and commercial food processing equipment.

SUMMARY OF THE INVENTION

A coating composition of this invention has a solids content of 25-80% by weight in an inert liquid carrier and is comprised of:

(a) a binder comprised of
  (1) 40-93%, based on the weight of the binder, of a polysiloxane resin-forming precondensate which has one or more of the units

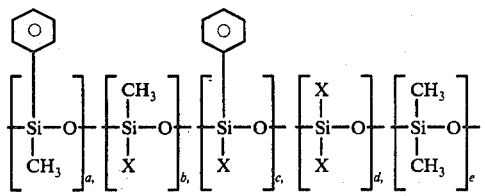

wherein
X is a functional group which allows cross-linking at its site, and
a, b, c, d and e are of a magnitude and in proportions which provide the resin with a degree of substitution, measured as the ratio of phenyl plus methyl groups to silicon atoms, of at least about 1.0, and a ratio of phenyl groups to silicon atoms of at least about 0.3,
and which has a silanol content above 4%, based on the weight of the precondensate;
  (2) 5-50%, based on the weight of the binder, of a fluorocarbon polymer; and
  (3) 2-40%, based on the weight of the binder, of an epoxy resin having the formula:

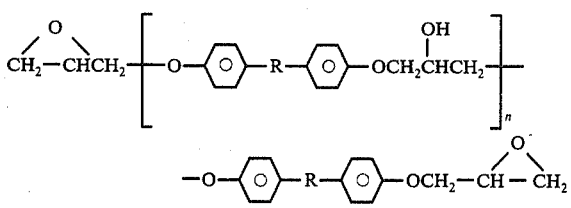

wherein
n is an integer from 0-42, and
R is an alkylene group of 1-4 carbon atoms;
(b) 0.2-10%, based on the weight of the binder, of a silicone fluid which is a dimethyl polysiloxane fluid having a viscosity of 50-5000 centistokes measured at 25° C.;
(c) a finely divided inorganic hardening agent in a hardening agent-to-binder ratio of about 5/100 to 400/100; and
(d) an inert liquid carrier.

Preferably, the precondensate, when measured at 60% resin solids in xylene at 25° C., has a viscosity of 30-50 centipoises, specific gravity of 1.03-1.2, and refractive index of 1.45-1.57. Precondensates having a random arrangement of the repeating units are, of course, included. (Percentages and proportions herein are by weight except where indicated otherwise.)

A metal cooking vessel coated with a cured film produced from the above composition is also part of the invention.

DESCRIPTION OF THE INVENTION

The coating composition of the invention preferably has a relatively high solids content of about 30-70%, more preferably 38-50%, in a suitable liquid carrier.

The film-forming binder constituents are dissolved in organic solvents such as toluene, xylene, tetrahydrofuran, butyl carbitol, ethylene glycol monoethyl ether, ethylene glycol monobutyl ether, and the like.

The binder of the novel coating composition of of the invention is a blend of polysiloxane resin-forming precondensate, an epoxy resin, and a fluorocarbon polymer.

The binder contains about 40-93% of silicone resin, 5-50% of fluorocarbon polymer, and 2-40% of epoxy resin in amounts necessary to equal 100%. Preferably, the binder contains 65-85% of silicone resin, 10-20% of fluorocarbon polymer, and 5-15% of epoxy resin.

Also present in the composition is a silicone fluid which is a dimethyl polysiloxane. The amount of dimethyl polysiloxane fluid utilized is based on the total weight of binder. The amount of fluid will range from 0.2-10%, based on the weight of the binder; preferably, the range will be 1-3%.

A finely divided inorganic hardening agent is used in the composition of the invention to provide a finish having increased scratch resistance, abrasion resistance, hardness, blister resistance, and decreased porosity. The hardening agent is added to the composition in a ratio of hardening agent to binder of about 5/100 to about 400/100, preferably, about 10/100 to about 70/100, more preferably, 20/100–40/100.

The combination of these components provides a coating composition that has excellent adhesion to unprimed, untreated substrates and produces a finish which may be light colored and has excellent thermal stability and release properties.

A particularly preferred methyl phenol polysiloxane resin, when measured at 60% solids in xylene at 25° C., has a viscosity of about 35–45 centipoises, a specific gravity of about 1.05–1.12, a refractive index of about 1.50–1.53, and it also has a softening point of about 75°–85° C.

Polysiloxane resins and resin-forming precondensates of the invention can be prepared by techniques known in the art. Generally, desired proportions of dimethyldichlorosilane, methylphenyldichlorosilane, and sometimes diphenyldichlorosilane are hydrolized to form cyclic structures, and then the cyclic structures are polymerized with acid or base to form the polysiloxane resin-forming precondensate. It is evident that appropriate proportions of the units selected for the structural formula must be provided in order to achieve the ratios of the preferred compositions and in order to obtain the desired resin-forming precondensates. For instance, those skilled in the art would know that if $a$, $b$, $c$ and $e$ are each zero and the structure is made entirely of

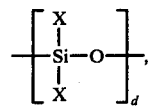

the resulting composition would be hydrated silicon dioxide which is not a resin-forming precondensate. Also, if $b$, $c$ and $d$ were all zero and the resin were made entirely of

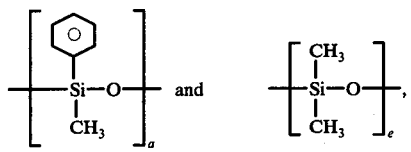

the result would be an elastomer rather than a resin.

The fluorocarbon polymers used in the composition of the invention are homopolymers and copolymers (meaning the polymer contains two or more different monomer units) of monoethylenically unsaturated hydrocarbon monomer completely substituted with fluorine atoms or completely substituted with a combination of fluorine atoms and chlorine atoms. Included in this group are perfluoroolefin polymers such as polytetrafluoroethylene (PTFE) and copolymers of tetrafluoroethylene and hexafluoropropylene in all monomer unit weight ratios, fluorochlorocarbon polymers such as polymonochlorotrifluoroethylene, and normally solid copolymers of tetrafluoroethylene and perfluoroalkyl vinyl ethers (wherein the alkyl group is of 1–5 carbon atoms). Mixtures of these can also be used.

A preferred fluoropolymer is a copolymer of tetrafluoroethylene (TFE) copolymerized with either a fluoroolefin or a perfluoro (alkyl vinyl ether).

When the TFE is copolymerized with a fluoroolefin, the copolymer will contain about 50–95% by weight of TFE unit, and about 50–5% by weight of hexafluoropropylene or other suitable fluoroolefin having the formula $CF_2 = CFY$, wherein Y is a $C_1$ to $C_8$ perfluoroalkyl radical. Copolymers of the type are described in U.S. Pat. Nos. 2,833,686; 2,946,763; and 3,085,083.

Especially useful is a tetrafluoroethylene/hexafluoropropylene copolymer (FEP). Preferably, hexafluoropropylene (HFP) content is between about 6.75 and about 27 weight percent of the copolymer and more preferably between about 8 and about 18 weight percent. These copolymers are prepared by reacting TFE and HFP in an aqueous system containing a dispersing agent and a free radical polymerization initiator according to procedures disclosed in Couture, U.S. Pat. No. 3,132,124. Additionally, the FEP copolymer preferred is particulate and has a specific melt viscosity from 5–60 $\times 10^4$ poises, more preferably 5–25 $\times 10^4$, and even more preferably 6–10 $\times 10^4$ poises.

By the term "specific melt viscosity" as used herein, is meant the apparent melt viscosity as measured at 372° C. under a shear stress of 6.5 pounds per square inch. The values herein referred to are determined using a melt indicator of the type described in the American Society of Testing Materials Test D-1238-57 T, modified for corrosion resistance to embody a cylinder and orifice of "Ampco" aluminum bronze and a piston weighing 60 grams, having a "Stellite" cobalt-chromium-tungston alloy tip. The resin is charged to the 0.375-inch I.D. cylinder which is held at 372° C. ± 0.5° C., allowed to come to an equilibrium temperature during 5 minutes, and extruded through the 0.0825-inch diameter, 0.315-inch long orifice under a piston loading of 5,000 grams. The specific melt viscosity in poises is calculated as 53,150 divided by the observed extrusion rate in grams per minute.

The epoxy resins utilized in the present invention are commonly known in the art. One class of such resins has the generalized formula

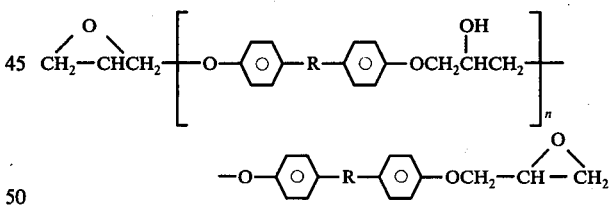

where $n$ is an integer from 0–42 and R is an alkylene group of 1–4 carbon atoms. The epoxy resins utilized in the present invention contain at least two epoxy groups per molecule and, therefore, upon curing of the composition, introduce no uncross-linkable extractable portions into the coating.

Preferably, to obtain a coating with high gloss, a liquid epoxy resin is used. An undiluted liquid epoxy resin where the average value of $n$ is about 0–3, R is isopropylidene, the viscosity is 1.2–225 poises at 25° C. as measured by ASTM-D-445, and the epoxy equivalent is about 150–470 is preferred. The epoxy equivalent is defined as the grams of resin containing 1 gram-equivalent of epoxide functionality as measured by ASTM-D-1652. A coating composition containing "Epon 828" is particularly preferred because finishes produced by such compositions have high gloss while maintaining high adhesion. "Epon 828" is a liquid epoxy resin where the average value of $n$ is about 0, R is isopropylidene, the viscosity of the undiluted resin is 100–160 poises at 25° C. as measured by ASTM-D-445, and the epoxy equivalent is 185–192.

Modifications of epoxy resins can also be utilized in the coating composition of the present invention. For example, it is known to those skilled in the art that when an epoxy compound containing a hydroxy group is brought in contact with an acid, there results an ester or mixture of esters. Thus, when phosphoric acid is added to an epoxy resin, a reaction occurs at one or more of the epoxy groups of the molecule and the resulting mixture contains both the mono- and diesters of phosphoric acid. A product of this reaction is exemplified by the formula

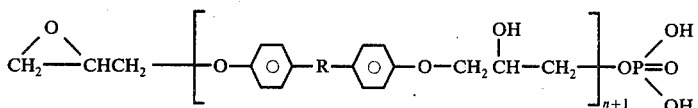

These modified epoxy resins can still function as epoxy resins in the coating compositions of the invention.

The dimethyl polysiloxane fluid utilized in the coating composition of this invention can have a viscosity of 0.65 to over a million centistokes measured at 25° C., but preferably, has a viscosity of 100–5000 centistokes. To form particularly high quality compositions, a viscosity of 500–1500 centistokes is preferred. The dimethyl polysiloxane fluid is a release agent which aids the release characteristics of the films produced.

The hardening agents that can be used in the composition of this invention include zirconium silicate, zirconium oxide, silicon dioxide, and reactive and unreactive aluminas. Examples of aluminas which can be used are calcined aluminas, low-soda aluminas, reactive aluminas, high-purity aluminas, tabular aluminas, calcium aluminate cement, and hydrated aluminas. The preferred hardening agents are reactive alumina. A preferred reactive alumina which is useful in a coating composition having excellent properties is "Reactive Alumina A-15SG" which is sold by Alcoa. This alumina consists of

| | |
|---|---|
| $Al_2O_3$ | 99.5+% |
| $Na_2O$ | .08 |
| $SiO_2$ | .07 |
| $Fe_2O_3$ | .01; | it, with compaction and sintering, can provide an all-alumina composition with a green body density of 2.86 gm/cc at 5000 psi, and fired density of 3.93 gm/cc, with only 10.1 percent linear shrinkage after one hour at 1665° C.

When a reactive alumina is used as the hardening agent, its ratio to binder is about 10/100 to about 70/100, preferably, 20/100 to 40/100.

Suitable liquid carriers include such organic solvents as those used for dissolving the film-forming binder constituents, for example, toluene, xylene, tetrahydrofuran, butyl carbitol, ethylene glycol monoethyl ether, ethylene glycol monobutyl ether, and the like.

Optionally, pigments (heat stable, filler or reinforcing pigment) can be used in the coating composition of the invention. A ratio of pigment to binder of about 1/100–400/100 can be utilized, preferably, about 1/100–200/100, more preferably, in compositions having excellent properties, 1/100–50/100. Typical pigments that can be used are, for example, carbon black, titanium dioxide, brown, black, and yellow iron oxides, mica, talc, china clay, metal powders, carbonates, potassium titanate fibrils, titanium dioxide fibrils, and the like.

To ensure wetting of the pigments and a stable dispersion, a wetting agent may be added to the composition in a concentration of 0.2–10% by weight based on the weight of the binder. Wetting agents useful are metal salts, particularly metal salts of fatty acids such as zinc octoate and cobalt naphthenate. A preferred zinc octoate is Nuodex® (a zinc octoate solution having 8% zinc metal content sold by Tenneco). A coupling solvent, such as V.M. and P. Naptha, is sometimes used to ensure solubility of the wetting agent within the coating composition.

The coating composition of this invention can be prepared by various methods known to the artisan. One method is to dissolve the silicone resin and wetting agent in suitable solvent, then blending the solution with the other constituents. Then the blend is ground by conventional techniques such as pebble mill grinding, ball mill grinding, sand mill grinding, and the like.

The composition of this invention can be applied to a smooth substrate, which has been cleaned by solvent wiping techniques, such as spraying, electrostatic spraying, roller coating, and the like. If desired, the substrate may be surface treated by such methods as frit coating and grit blasting and a primer may be applied.

The composition is applied to the substrate to a thickness of 0.2–5 mil (dry), preferably 0.5–1.5 mil (dry), and is then baked for about 5–45 minutes at about 200°–400° C.

The coating composition of this invention forms excellent finishes not only on cookware but also on ice cube trays, dough cutters, paper cutters, and can be used as a lubricant coating on bearing and curtain rods and can be used as a coating on coin machine slots, fan vents, shovels, and discardable aluminum utensils.

The following example illustrates the invention. All quantities are on a weight basis unless otherwise indicated.

EXAMPLE 1

A coating composition was prepared as follows:
(a) Preparing a resin solution by mixing until dissolved:
Silicone resin flake which is a heat curable structured methyl phenyl polysiloxane resin having the repeating structural formula

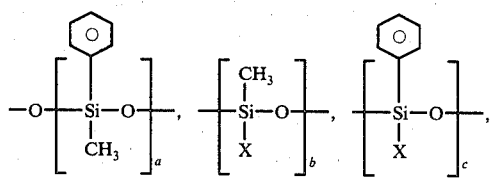

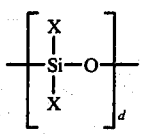

wherein
x is a functional group which allows cross-linking at its site, and a, b, c, and d are positive integers which are sufficiently large to provide the resin, when

| | Parts by Weight |
|---|---|
| measured at 60% resin solids in xylene at 25° C, with a viscosity of 40 centipoise, specific gravity of 1.08, and refractive index of 1.518; and a silanol content above 5% based on the weight of the resin. | 80.00 |
| xylene | 80.00 |
| V.M. and P. Naphta | 10.00 |
| Nuodex ® (a zinc octoate solu-metal, sold by Tenneco) | 9.25 |
| (b) adding the following in order to the product of (a) and pebble grinding for 21 hours: | |
| silicone fluid (DC-200, a polydimethyl siloxane having a viscosity of 1000 centistokes, sold by Dow Corning) | 2.0 |
| titanium dioxide pigment | 15.0 |
| reactive alumina (A-15 SG ® sold by Alcoa) | 10.0 |
| Teflon ® TE-9061- (a dry FEP flake sold by E. I. du Pont de Nemours and Company) | 15.0 |
| (c) adding, in order, with stirring to | |

| | Parts by Weight |
|---|---|
| the product of (b) and then mixing; "Epon 828" (a liquid epoxy resin sold by Shell Chemical Company) | 5.0 |
| xylene | 11.2 |

An aluminum muffin pan was wiped clean with acetone to remove any residue grease. The above coating was then sprayed onto the pan to a thickness of 0.7 mil (dry), air dried for about 10 minutes and then baked for 7 minutes at 325° C. The resulting finish on the pan had a good glossy appearance, excellent adhesion to smooth clean aluminum, pencil hardness of HB-F, a light color, and was fully cured as measured by a 50 double wipe test with toluene. The coated pan was subjected to a 25 bake test at 220° C. with blueberry muffin mix and meat loaf mix. After the test, the finishes release properties, ease of cleaning, and appearance remained excellent.

I claim:

1. A coating composition having a solids content of 25-80% by weight in an inert liquid carrier and comprised of:
   (a) a binder comprised of
      (1) 40-93%, based on the weight of the binder, of a polysiloxane resin-forming precondensate which has one or more of the units

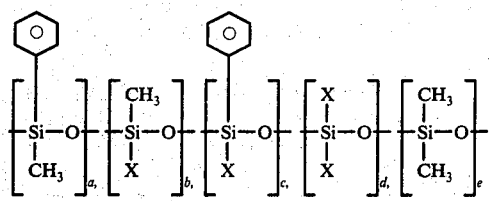

wherein
X is a functional group which allows cross-linking at its site, and
a, b, c, d and e are of a magnitude and in proportions which provide the resin with a degree of substitution, measured as the ratio of phenyl plus methyl groups to silicon atoms, of at least about 1.0, and a ratio of phenyl groups to silicon atoms of at least about 0.3,
and which has a silanol content above 4%, based on the weight of the precondensate;
      (2) 5-50%, based on the weight of the binder, of a fluorocarbon polymer; and
      (3) 2-40%, based on the weight of the binder, of an epoxy resin having the formula

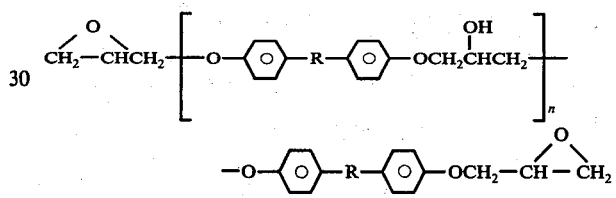

wherein
n is an integer from 0-42, and
R is an alkylene group of 1-4 carbon atoms;
   (b) 0.2-10%, based on the weight of the binder, of a silicone fluid which is a dimethyl polysiloxane fluid having a viscosity of 50-5000 centistokes measured at 25° C.;
   (c) a finely divided inorganic hardening agent in a hardening agent-to-binder ratio of about 5/100 to 400/100; and
   (d) a inert liquid carrier.

2. The coating composition of claim 1 wherein the binder is comprised of
   (a) 65-85%, based on the weight of the binder, of said precondensate,
   (b) 10-20%, based on the weight of binder, fluorocarbon polymer; and
   (c) 5-15% epoxy resin.

3. The coating composition of claim 2 comprised of 1-3%, based on the weight of the binder, silicone fluid; and
hardening agent is a hardening agent-to-binder ratio of about 10/100 to about 70/100.

4. The coating composition of claim 1 wherein the precondensate, when measured at 60% resin solids in xylene at 25° C., has a viscosity of 30-50 centipoises, specific gravity of 1.03-1.2, and refractive index of 1.45-1.57.

5. The coating composition of claim 4 wherein the precondensate has a silanol content above 5%, based on the weight of the resin, and a softening point of about 75°-88° C.,
and, when measured at 60% resin solids in xylene at 25° C.,
a viscosity of about 35–45 centipoises,
specific gravity of about 1.05–1.12, and
refractive index of about 1.50–1.53.

6. The coating composition of claim 1 wherein the fluorocarbon polymer is a copolymer of tetrafluoroethylene and hexafluoropropylene.

7. The coating composition of claim 1 wherein the epoxy resin is a liquid having a viscosity of 1.2–225 poises
at 25° C., and an epoxy equivalent of 150–470; and wherein
$n$ is an integer from 0–3, and
R is isopropylidene.

8. The coating composition of claim 1 wherein the silicone fluid has a viscosity at 25° C. of about 500–1500 centistokes.

9. The coating composition of claim 1 wherein the hardening agent is an alumina.

10. The coating composition of claim 1 containing pigment in a pigment-to-binder ratio of about 1/100 to about 400/100; and a wetting agent in a concentration of 0.2–10%, based on the weight of the binder.

11. The coating composition of claim 1 wherein
(a) the binder is comprised of
(1) 65–85%, based on the weight of the binder, of a polysiloxane resin-forming precondensate having
(a) silanol content above 5%, based on the weight of the resin,
(b) softening point of about 75°–85° C., and
(c) when measured at 60% resin solids in xylene, viscosity of about 35–45 centipoises, specific gravity of about 1.05–1.112, and refractive index of about 1.50–1.53;
(2) 10–20%, based on the weight of the binder, of fluorocarbon polymer which is a copolymer of tetrafluoroethylene and hexafluoropropylene; and
(3) 5–15%, based on the weight of the binder, of liquid epoxy resin having a viscosity of 1.2–225 poise at 25° C., and an epoxy equivalent of 150–470; and
wherein
$n$ is an integer from 0–3, and
R is isopylidene;
(b) 1–3%, based on the weight of the binder, of a silicone fluid having a viscosity of 500–1500 at 25° C.;
(c) hardening agent which is alumina in a hardening agent-to-binder ratio of about 10/100 to 70/100;
(d) pigment in a pigment-to-binder ratio of about 1/100 to about 400/100;
(e) wetting agent in a concentration of 0.2–10%, based on the weight of the binder; and
(f) inert liquid carrier.

12. A cooking vessel coated with a film produced by curing the coating composition of claim 1.

* * * * *